US012555454B2

(12) United States Patent  
Kerstetter et al.

(10) Patent No.: US 12,555,454 B2  
(45) Date of Patent: *Feb. 17, 2026

(54) RF SAFETY SYSTEM

(71) Applicant: PERFECTVISION MANUFACTURING, INC., Little Rock, AR (US)

(72) Inventors: George Kerstetter, Little Rock, AR (US); Charles Darwin Davidson, Jr., Little Rock, AR (US)

(73) Assignee: PERFECTVISION MANUFACTURING, INC, Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,436

(22) Filed: Dec. 29, 2021

(65) Prior Publication Data

US 2022/0139195 A1 May 5, 2022

Related U.S. Application Data

(63) Continuation of application No. 16/865,594, filed on May 4, 2020, now Pat. No. 11,217,081.

(51) Int. Cl.
| | |
|---|---|
| *G08B 21/18* | (2006.01) |
| *G08B 5/38* | (2006.01) |
| *H04W 52/44* | (2009.01) |

(52) U.S. Cl.  
CPC ............... *G08B 21/18* (2013.01); *G08B 5/38* (2013.01); *H04W 52/44* (2013.01)

(58) Field of Classification Search  
CPC ......... H04W 4/90; H04W 4/023; H04W 4/40; H04W 4/80; H04W 84/12; H04W 72/0453; H04W 4/38; H04W 52/18; H04W 52/283; H04W 52/34; H04W 52/343; H04W 52/367; H04W 84/06; H04W 84/18; H04W 24/08; H04W 4/00; H04W 4/027; H04W 4/029; H04W 4/44; H04W 88/00; H04W 88/16; H04B 7/0617; H04B 5/26; H04B 5/73; H04B 5/77; H04B 1/0483; H04B 7/18504; H04B 7/18506; H04B 7/18513; H04B 7/0684; H04B 1/3888; H04B 7/024; H04B 7/026; H04B 7/0408; H04B 7/0413; H04B 7/0626; H04B 7/2041; B60Q 9/008; G06N 5/02; G06N 5/048; G06V 20/56; G06V 20/597; G10L 15/22; G10L 15/26; G10L 2021/02166; G10L 21/0232; G10L 25/78; G08G 1/0116; G08G 1/012; G08G 1/0129; G08G 1/0141; G08G 1/048; G08G 1/096716; G08G 1/096741; G08G 1/096775; G08G 1/096783; G08G 1/166;

(Continued)

(56) References Cited

U.S. PATENT DOCUMENTS

| | | | |
|---|---|---|---|
| 8,085,203 B1 * | 12/2011 | Klein .................. | H01Q 21/065 343/846 |
| 8,381,460 B1 * | 2/2013 | McDermott .......... | E01D 15/124 52/118 |

(Continued)

*Primary Examiner* — Daniel Previl  
(74) *Attorney, Agent, or Firm* — Paul D. Chancellor; Ocean Law

(57) ABSTRACT

An RF safety system controls antenna radiation based on antenna states determined at least in part by one or more of the antenna orientation, position, and/or acceleration.

20 Claims, 9 Drawing Sheets

(58) Field of Classification Search
CPC . G08G 1/167; G08G 1/205; H04M 1/724098; H04M 1/72454; H04M 1/72463; H04M 1/04; H04M 1/72409; H04M 1/724092; H04M 1/72412; H04M 2250/06; H04R 1/406; H04R 2201/403; H04R 2499/13; H04R 3/005; H01L 21/76224; H01L 2924/00; H01L 2924/0002; H10D 84/00; H10D 84/0109; H10D 84/0151; H10D 84/038; H10D 89/10; B63C 11/26; B63C 2009/0017; B63C 9/00; B63C 9/0005; B63C 9/08; B63C 9/13; B63C 9/21; G01R 33/3415; G01R 33/3621; G01R 33/3628; G01R 33/3657; G01R 33/58; G01S 13/003; G08B 21/02; G08B 21/08; G08B 21/088; G08B 21/10; G08B 25/016; G08B 25/12; G08B 5/002; H03F 1/0227; H03F 1/0261; H03F 1/0277; H03F 2200/171; H03F 2200/222; H03F 2200/27; H03F 2200/318; H03F 2200/336; H03F 2200/387; H03F 2200/411; H03F 2200/414; H03F 2200/417; H03F 2200/451; H03F 2200/504; H03F 2200/534; H03F 2200/537; H03F 2200/541; H03F 2203/21106; H03F 2203/21142; H03F 2203/21157; H03F 3/19; H03F 3/195; H03F 3/211; H03F 3/245; H03F 3/602; H03F 3/68; H03F 3/72; H04L 2025/03414; H04L 2025/0377; H04L 2025/03802; H04L 25/0204; H04L 25/0224; H04L 25/03343; H04L 1/0003; H04L 1/0009; H04L 1/0026; H04L 1/0057; H04L 1/007; H04L 67/04; H04L 69/329; A42B 1/245; A42B 1/00; A42B 3/00; A42B 7/00; A42B 5/00; A61B 2560/0462; A61B 2562/0219; A61B 5/112; A61B 5/1126; A61B 5/4088; A61B 5/6898; A61B 5/7264; A61B 5/746; C09K 9/02; E06B 2007/023; E06B 2007/026; E06B 2009/2464; E06B 2009/2476; E06B 7/02; E06B 7/10; E06B 9/24; F24S 20/63; G02F 1/153; G02F 1/163; G06F 1/163; G06F 3/0412; G16H 50/70; H01Q 1/245; H01Q 1/28; H01Q 1/3291; H01Q 1/526; H01Q 21/28; H02S 40/32; H03H 9/46; H03H 9/485; H03H 9/525

USPC ........ 340/689, 691.1, 691.7, 3.43, 3.44, 3.9, 340/825.23, 5.2, 10.34, 686.6

See application file for complete search history.

(56) References Cited

U.S. PATENT DOCUMENTS

| | | | | |
|---|---|---|---|---|
| 9,295,069 | B2* | 3/2016 | Puranik | H04B 1/3838 |
| 10,992,158 | B2* | 4/2021 | Glover | H02J 50/20 |
| 2002/0081978 | A1* | 6/2002 | Hou | H04B 17/102 |
| | | | | 455/67.11 |
| 2004/0155826 | A1* | 8/2004 | Pecora, Jr. | H01Q 9/16 |
| | | | | 343/727 |
| 2006/0114129 | A1* | 6/2006 | Henty | G06F 3/0202 |
| | | | | 341/22 |
| 2006/0255948 | A1* | 11/2006 | Runyon | H01Q 13/085 |
| | | | | 340/572.7 |
| 2009/0079660 | A1* | 3/2009 | Elmore | H04B 3/56 |
| | | | | 343/904 |
| 2009/0267865 | A1* | 10/2009 | Miller | H01Q 21/30 |
| | | | | 343/901 |
| 2010/0289662 | A1* | 11/2010 | Dasilva | G01V 15/00 |
| | | | | 340/686.6 |
| 2012/0050109 | A1* | 3/2012 | Nysen | H01Q 25/00 |
| | | | | 343/700 MS |
| 2013/0144411 | A1 | 6/2013 | Savarese | |
| 2013/0295941 | A1* | 11/2013 | Williams | G06Q 10/10 |
| | | | | 455/445 |
| 2015/0358979 | A1* | 12/2015 | Puranik | H04W 72/542 |
| | | | | 455/452.2 |
| 2016/0129332 | A1 | 5/2016 | Davenport | |
| 2016/0224951 | A1* | 8/2016 | Hoffberg | G06Q 40/06 |
| 2018/0062239 | A1* | 3/2018 | McCoy | H01Q 1/3216 |
| 2018/0244292 | A1* | 8/2018 | Bailey | B61L 23/24 |
| 2018/0294570 | A1* | 10/2018 | Stowell | H01Q 11/04 |
| 2019/0215765 | A1* | 7/2019 | Ramasamy | H04W 52/243 |
| 2019/0349783 | A1* | 11/2019 | Barker | H04W 16/28 |
| 2020/0053843 | A1* | 2/2020 | Otsuki | H05B 6/72 |
| 2020/0242924 | A1* | 7/2020 | Publicover | G08G 1/087 |
| 2020/0300965 | A1* | 9/2020 | Wu | G01S 7/2883 |
| 2021/0167484 | A1 | 6/2021 | Ryden | |
| 2022/0146348 | A1* | 5/2022 | O'Donnell | B23Q 17/0966 |

\* cited by examiner

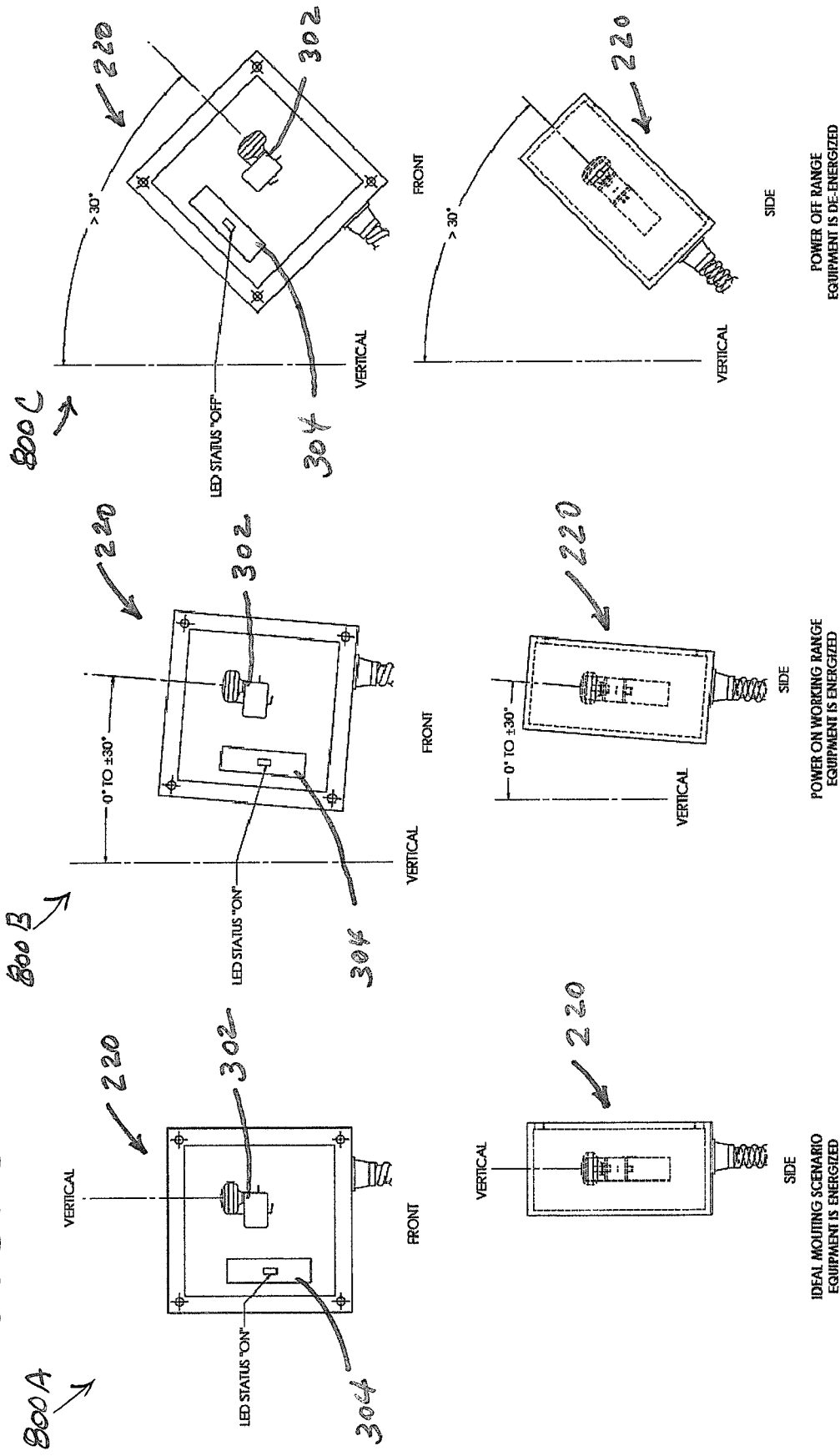

RF SAFETY SYSTEM

PRIORITY CLAIM

This application is a continuation of U.S. application Ser. No. 16/865,594 filed May 4, 2020 and entitled RF Shut Down.

BACKGROUND OF THE INVENTION

Emissions of Radio Frequency (RF) energy (RF Radiation) are common. For example, every antenna used to transmit radio signals is a source of RF radiation.

Human exposure to, and danger from, RF radiation generally depends upon how close the source is to our physical bodies. For example, this proximity may be more important than the power level (or wattage) of the radiation. This is because RF Radiation dissipates with distance. For example, low powered exposure next to a person can be more dangerous than a more powerful exposure at a distance.

Because the distance from an RF source to a person determines RF radiation intensity, potential harm from an RF transmission is reduced by distance from the source. It is for this reason that antennas transmitting RF signals at high powers are located away from people. These antennas may be mounted atop a building, mast, or structure to assure an adequate separation distance is maintained.

Cell phone communications illustrate the use of RF signals. Here, it is common for the cell phone to exchange signals with a cell or antenna tower ("tower" or "mast"). Tower transmission power, such as 5G networks transmissions, may reach or exceed 100 watts and the distance between towers may be on the order of one or a few city blocks.

Field of Invention

This invention relates to the electrical and electronic arts. In particular, the invention provides RF signal control to control antenna radiation.

Discussion of the Related Art

Transmission of RF signals from antennas generally requires a signal that passes through a transmitter before reaching the antenna. Signal transmission from such systems is generally controlled by transmitter or transceiver operation. For example, if electric power supplying the transmitter is interrupted, then the signal transmitted by the antenna is interrupted.

SUMMARY OF THE INVENTION

The present invention provides an RF safety system. In an embodiment, the RF safety system comprises: An antenna fixed above the ground; an antenna state determined at least in part by one or more of an antenna orientation, position, and/or acceleration; and, control of antenna radiation dependent at least in part on the antenna state.

In an embodiment, the RF safety system comprises a sensor that indicates one or more of antenna orientation, position, and/or acceleration.

In an embodiment the RF safety system wherein sensor data is used to find a safe distance between the antenna and bystanders.

In an embodiment the RF safety system comprises a structure that includes the antenna and a vertical construct for holding the antenna aloft.

In an embodiment the RF safety system wherein the sensor is mounted on the structure.

In an embodiment, the RF safety comprises: a power supply for supplying an RF signal source; the RF signal source for driving the antenna to radiate; and, an electrical circuit between the power supply and the antenna for controlling antenna radiation.

In an embodiment, the RF safety system wherein the electrical circuit is between the RF signal source and the antenna.

In an embodiment, the RF safety system wherein the electrical circuit acts as a switch.

In an embodiment, the RF safety system wherein RF signals for driving the antenna to radiate are controlled at least in part based on inclination of the structure.

In an embodiment, the RF safety system wherein either of a sudden impact to the structure or collapse of the structure results in no RF signals reaching the antenna and no radiation from the antenna.

BRIEF DESCRIPTION OF THE DRAWINGS

The present invention is described with reference to the accompanying figures. These figures, incorporated herein and forming part of the specification, illustrate embodiments of the present invention and, together with the description, further serve to explain the principles of the invention and to enable a person skilled in the relevant art to make and use the invention.

FIGS. 8A-C show various inclinations of a sensor for use with the equipment of FIG. 1.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

As used herein, coupled means directly or indirectly connected by a suitable means known to persons of ordinary skill in the art. Coupled items may include interposed features such as, for example, A is coupled to C via B. Unless otherwise stated, the type of coupling, whether it be mechanical, electrical, fluid, optical, radiation, or other is provided by the context in which the term is used.

Figure 1A:
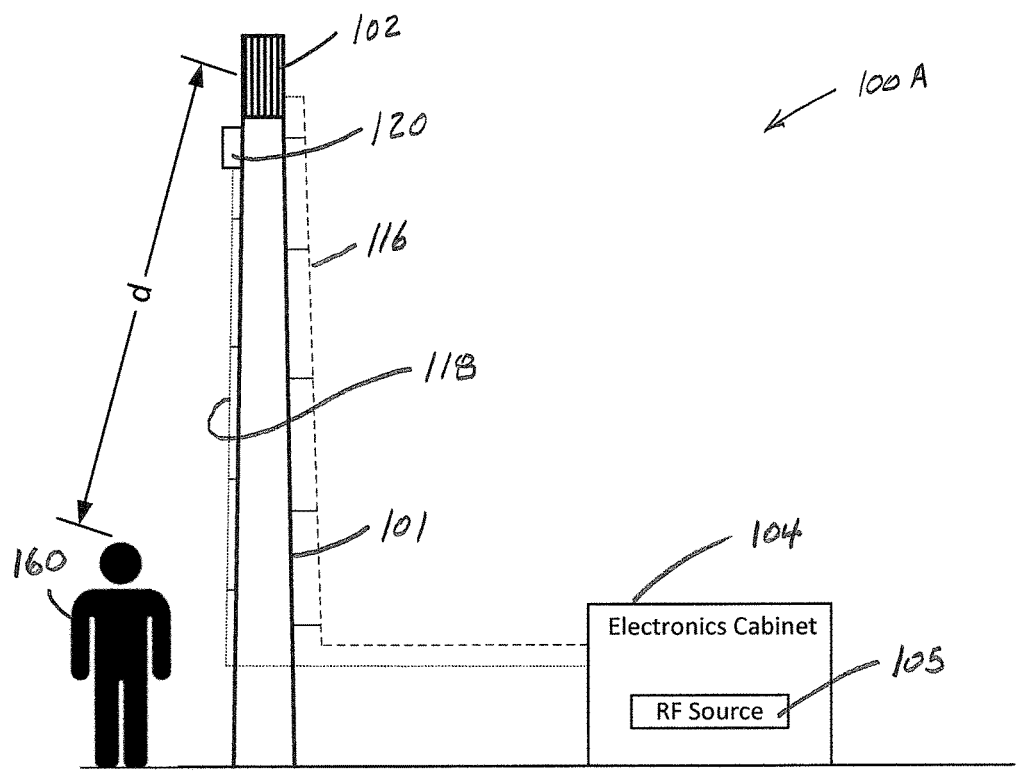
FIGS. 1A-B shows transmission towers or poles and related equipment in accordance with the present invention.

FIG. 1A shows a transmission tower or pole and related equipment 100A. In the figure, a pole or tower 101 supports an antenna(s) 102. An RF source or transmitter/transceiver 105 within an electronics cabinet 104 (such as a ground mounted electronics cabinet) drives the antenna via a first communications line 116 such as an electrical cable(s) or waveguide. Notably, any of the cables mentioned herein may be one or multiple cables and may incorporate metal conductors and/or optical conductors. The cable(s) may be hybrid cable such as a cable including electrical conductors and optical conductors.

Mounted to and/or moving with the pole/tower 101 or antenna 102 is a sensor or sensor package 120. The sensor package may be interconnected with any of the transmitter/transceiver, to a wireless communications system, or to another signaling system. In some embodiments sensor information or information derived therefrom is made available to operators of a CATV system, a utility system, or a telephone system. As shown, the sensor package is interconnected with the electronics cabinet 104 via a second communications line 118 such as an electrical cable(s).

The sensor package senses or is used to sense a pole/tower 101 or antenna 102 orientation, position, or impact. For example, the sensor package may indicate a proper or improper antenna location.

As seen in the figure, a person 160 stands at a distance "d" below the antenna 102. This distance "d" that separates the person from antenna RF emissions should be adequate to protect the person from the deleterious effects of antenna RF emissions. This distance may be referred to as a "safe" distance. In some embodiments, antenna height may be used to determine the tilt allowable to maintain a safe distance and sensor controls may allow an antenna height input to determine this tilt value. In some embodiments, antenna power may be used to determine a safe distance and sensor controls may allow an antenna power input to determine this safe distance.

Where the structure or its equipment are impacted, tolerable accelerations, velocities, and positions of the structure or its equipment may be derived from the item most susceptible to impact, for example the acceleration of the antenna. Tolerable accelerations, velocities, and positions of the structure or its equipment may also be derived from operating experience.

Figure 1B:
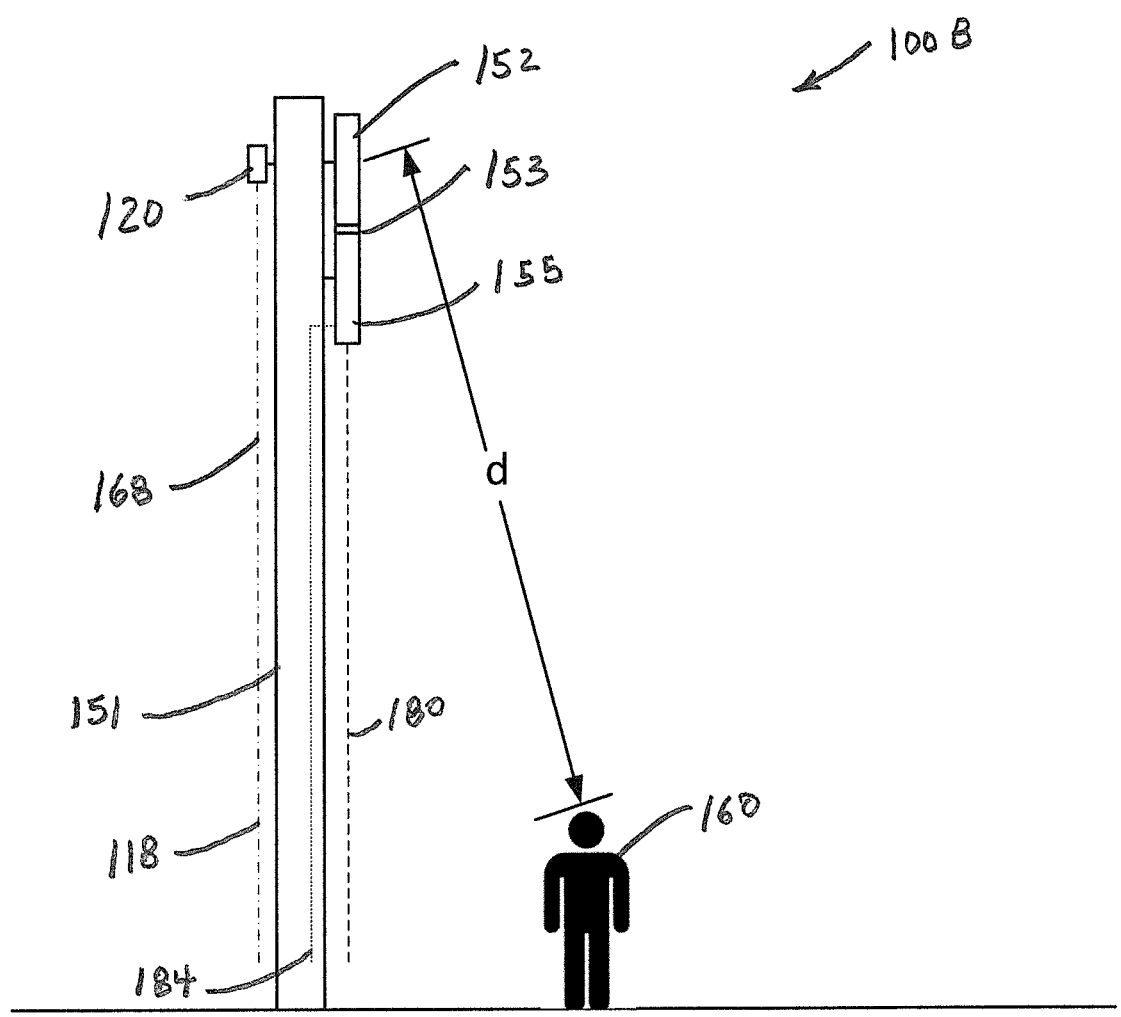

FIG. 1B shows a transmission tower or pole and related equipment 100B. In the figure, a pole or tower 151 supports an antenna(s) 152. An RF source or transmitter/transceiver 155 mounted to the tower or pole 151 drives the antenna 152. This signal driving the antenna may pass through an interface 153 between the RF source and the antenna such as a signal conditioning interface.

The transmitter/transceiver 155 may be connected to a power source and/or a signal source via a cable or cables such as those shown 180, 184. Cable 180 may be attached to an exterior surface of the tower or pole 151. Cable 184 may pass through an interior of the pole.

Mounted to and/or moving with the tower or pole 151 or antenna 152 is a sensor or sensor package 120. The sensor package may be interconnected with any of the transmitter/transceiver, to a wireless communications system, or to another signaling system. In some embodiments sensor information or information derived therefrom is made available to operators of a CATV system, a utility system, or a telephone system. As shown, a cable 168 from the sensors is available for any such connection.

The sensor package senses or is used to sense a pole/tower 151 or antenna 152 orientation, position, or impact. For example, the sensor package may indicate a proper or improper antenna location.

As seen in the figure, a person 160 stands at a distance "d" below the antenna 152. This distance "d" that separates the person from antenna RF emissions should be adequate to protect the person from the deleterious effects of antenna RF emissions. This distance may be referred to as a "safe" distance. In some embodiments, antenna height may be used to determine the tilt allowable to maintain a safe distance and sensor controls may allow an antenna height input to determine this tilt value. In some embodiments, antenna power may be used to determine a safe distance and sensor controls may allow an antenna power input to determine this safe distance.

Where the structure or its equipment are impacted, tolerable accelerations, velocities, and positions of the structure or its equipment may be derived from the item most susceptible to impact, for example the acceleration of the antenna. Tolerable accelerations, velocities, and positions of the structure or its equipment may also be derived from operating experience.

Figure 2A:
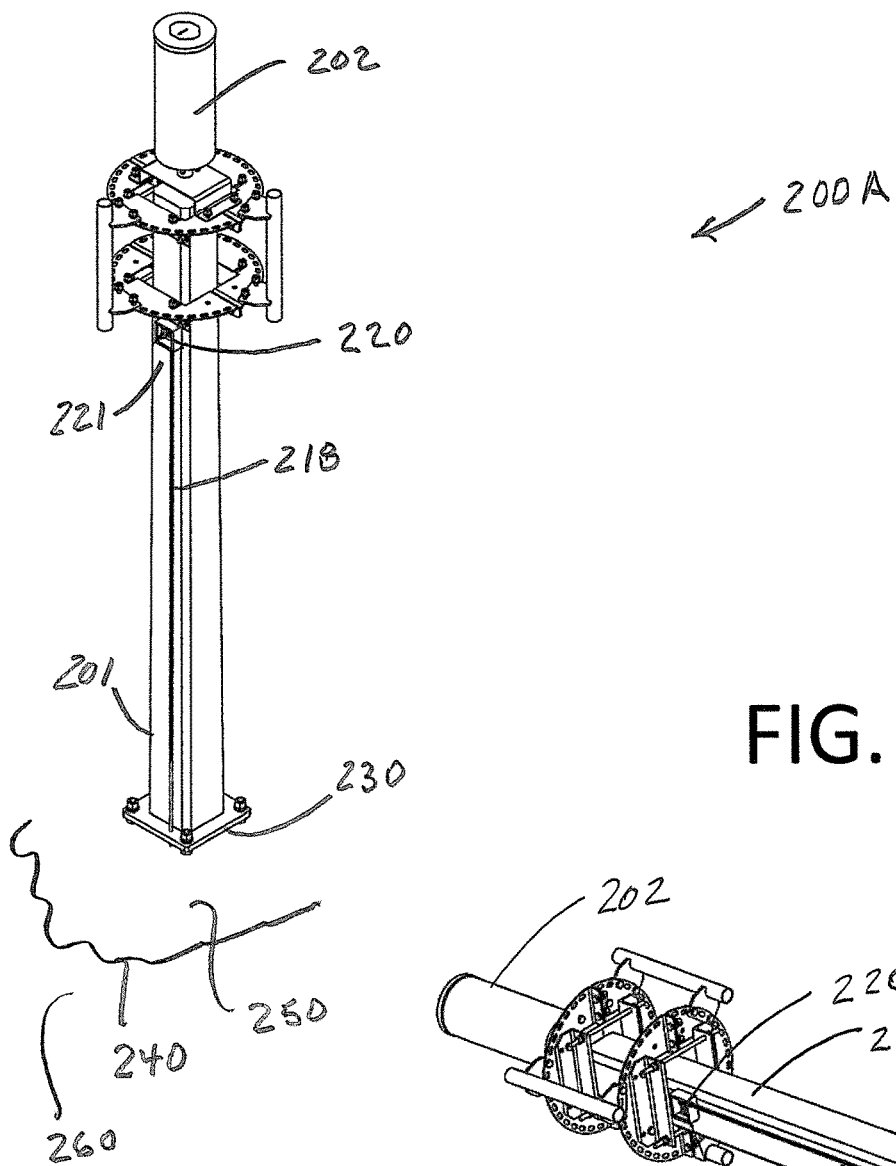
FIGS. 2A-B show a mast for use with the equipment of FIG. 1.

FIG. 2A shows a structure with an antenna(s) mounted atop an antenna mast such as an elongated structure, pole, or tower 200A.

An antenna mast 201 is supported by mast base 230. In various embodiments, the mast base may be attached to a concrete or other pad 240 as shown. In various embodiments, the mast may be an elongated member(s) extending from the base. One or more of the mast members may be metallic, concrete, wood, and/or composite. As mentioned above, a transmitter/transceiver for interconnection with the antenna may be mounted on the mast.

A sensor package 220 is affixed to the mast 201. For example, the sensor package may be attached directly or indirectly to the mast. For example, the sensor package may be attached below the antenna(s) (as shown). An electrical cable 218 extends from the sensor package. The electrical cable may be routed to tower electrical systems such as to an electronics cabinet 104.

Figure 2B:
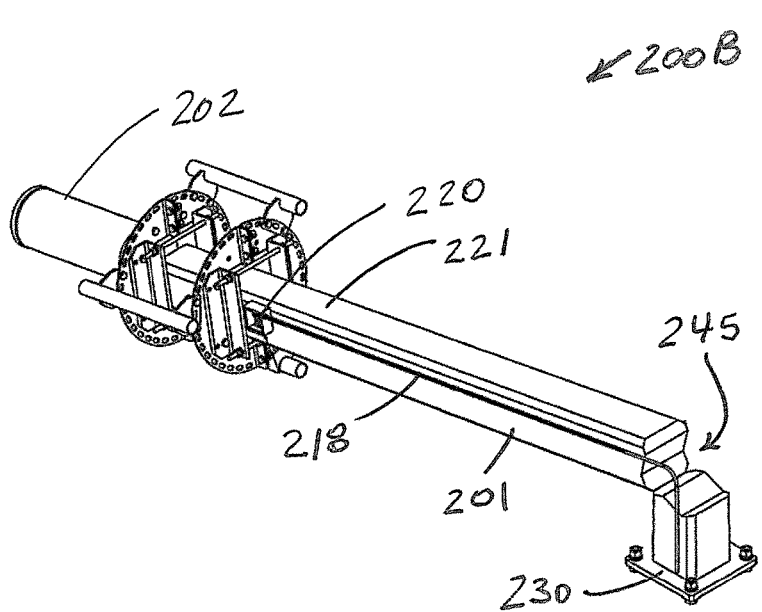

FIG. 2B shows a failed antenna mast 200B. Notably, failure of the antenna mast 201, base 230, or antenna 202 may occur in different locations and may be due to many different causes. For example, the structure 200A may be subject to an automobile or other strike, wind damage, earthquake damage, and the like. Whatever the case, a failure of the structure 200A results in a change antenna 202 orientation or position.

A typical failure of the structure 200A results when the mast 201 is struck by a moving object such as an automobile. This strike may bend or break 245 the mast 201 such that a normally upright antenna 202 is no longer upright but tilts toward a surface 250 or the ground 260.

Where the sensor package 220 is mounted to move with the mast or an upper portion of the mast 221, a sufficiently failed mast that tilts toward the ground 260 results in a misoriented sensor package.

Figure 3A:
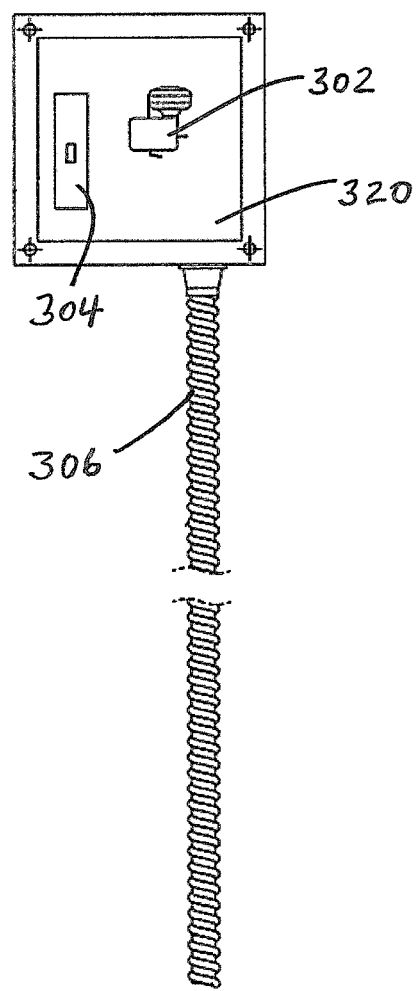
FIGS. 3A-B show a sensor package for use with the equipment of FIG. 1.
Figure 3B:
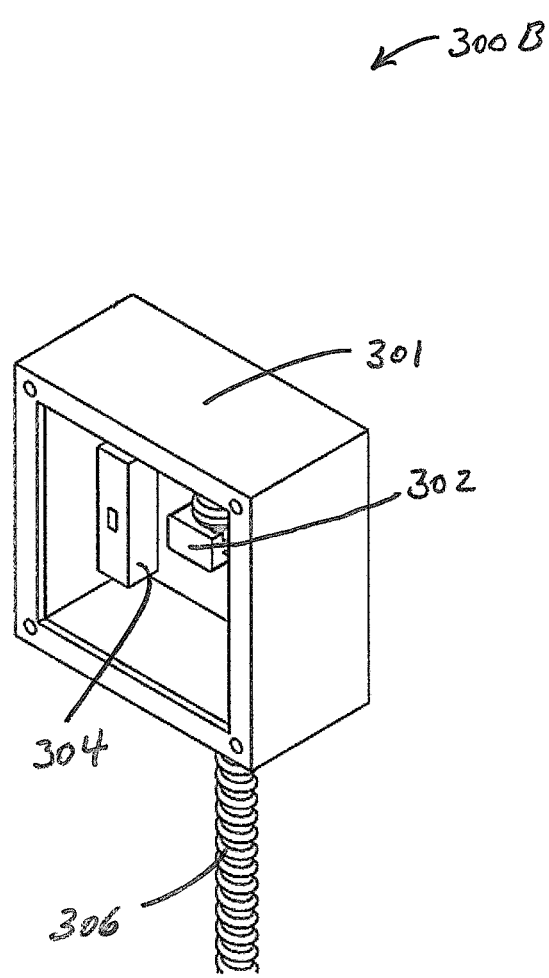

FIGS. 3A-B show a sensor package 300A-B using plan and perspective views. The sensor package may include a box 301 that houses the sensor 302. The package may further include a visual indicator 304 such as an LED indicator. Where a visual indicator is used, the box may include a translucent cover 320 through which the visible indicator may be seen.

An electrical cable in a protective cover 306 extends from the sensor. The electrical cable may be routed to tower electrical systems such as to an electronics cabinet 104.

As mentioned above, a sensor package 220 may sense impact, tilting, misorientation, or acceleration of an antenna or its supporting mast, for example misorientation of the antenna 202 or its supporting mast 201. Various sensor may be used for this purpose including tilt sensors, inclinometers, orientation sensors, altitude sensors, misorientation sensors, and accelerometers. In some embodiments sensors include one or more of mechanical, mercury or powered tilt sensors or switches. In some embodiments sensors include an impact sensor similar to an airbag sensor or crash sensor.

The visual indicator may be visible from a distance such that it is viewable from the ground or from locations nearby. Indicator color may be used to indicate various sensor measurements or information derived therefrom. For example, red may indicate trouble while green may indicate no trouble. Indicator flash sequences may be used to indicate various sensor measurements or information derived therefrom. For example, quick flashes may indicate one state while slow flashes may indicate another state.

Figure 4A:
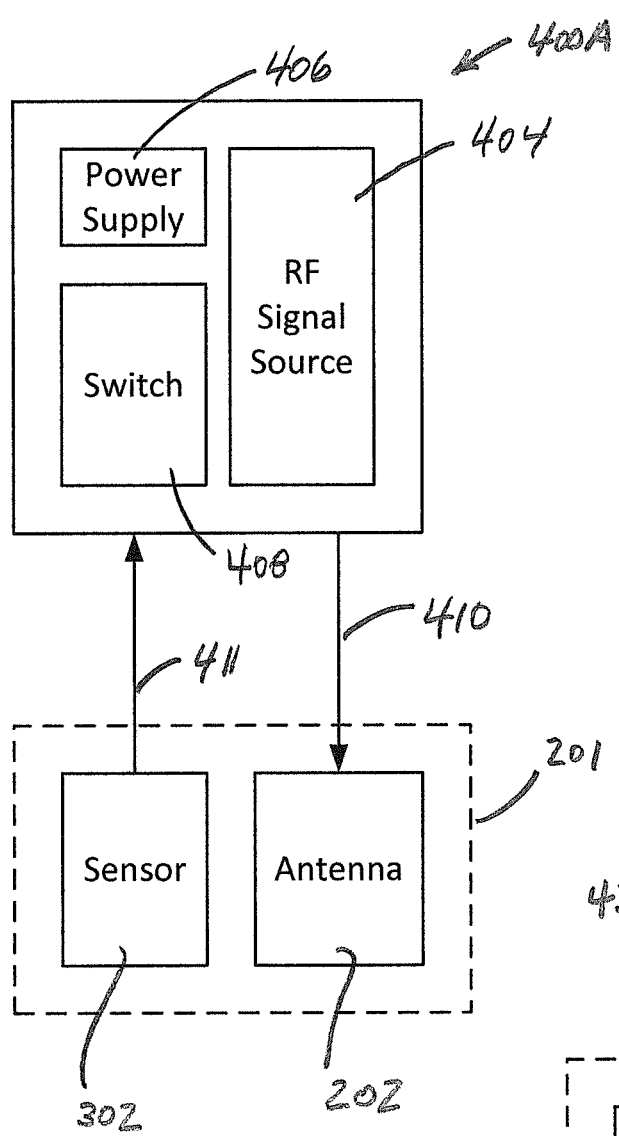
FIGS. 4A-B show electrical block diagrams typical of the equipment of FIG. 1.
Figure 4B:
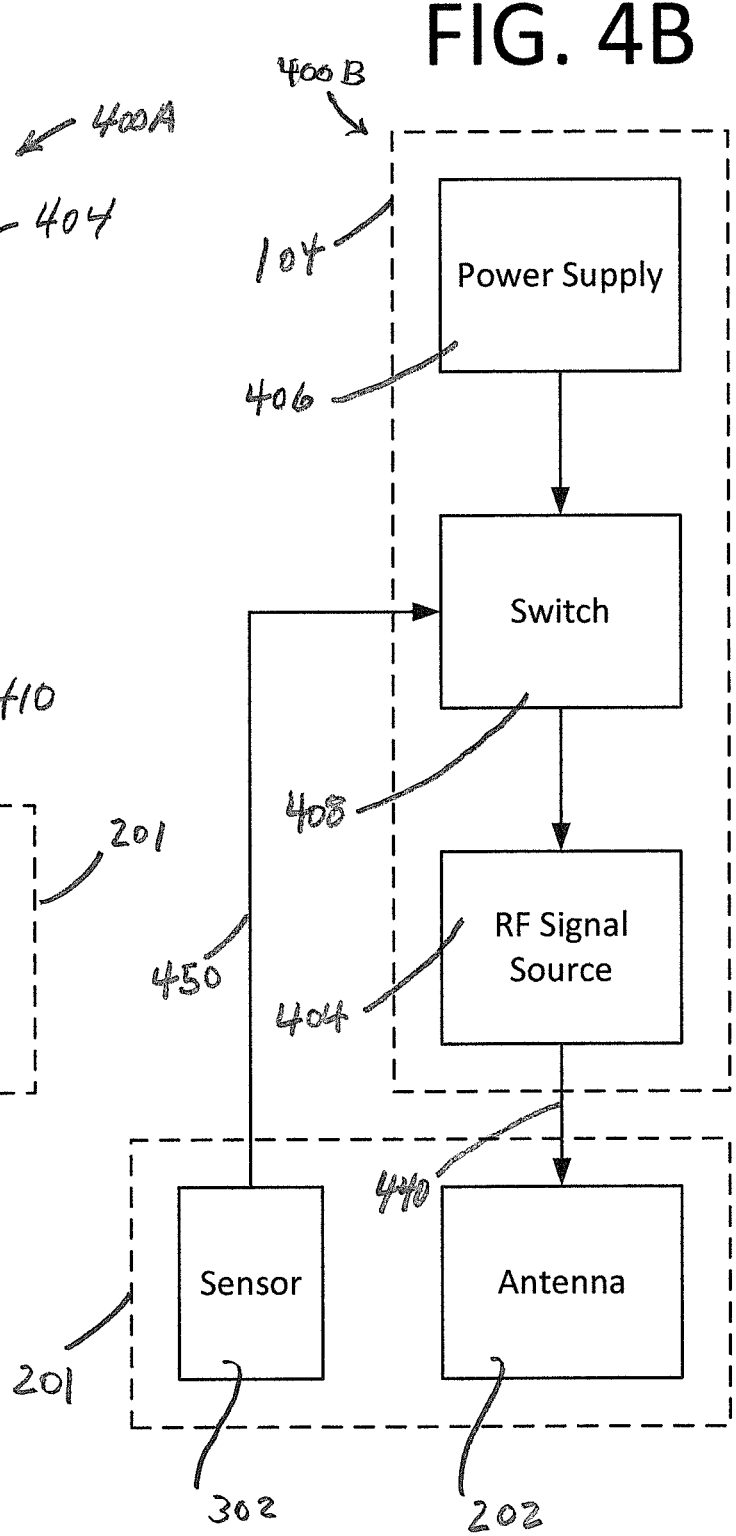

FIGS. 4A-B show electrical block diagrams including the antenna, sensor, and interconnecting circuitry 400A-B.

In FIG. 4A, a housing such as an electrical cabinet 104 may enclose an RF signal source 404, a power supply for the RF signal source 406, and a switch 408 for interrupting delivery of the RF signal to the antenna. Interconnecting with this equipment is a sensor 302 or sensor package 220 and an antenna 202 supported by a mast 201. In some embodiments line 411 is for transporting signals from the sensor to the electronics cabinet 140 and/or the switch 408.

Line 410 is for transporting the RF signal to the antenna 202. The electrical signal for driving the antenna 202 may be interrupted when the power supplying the RF signal source is interrupted or when the signal carried by line 410 is otherwise interrupted. For example, using the switch 408 controlled by the sensor 302 or a similar means to interrupting the power required to operate the RF signal source ends signal transmission via line 410 to the antenna. For example, using the switch 408 controlled by the sensor or a similar means to interrupt the signal from the RF signal source and normally transported by line 410 ends signal transmission via line 410 to the antenna.

In FIG. 4B a housing such as an electrical cabinet 104 may enclose an RF signal source 404, a power supply for the RF signal source 406, and a switch 408 for interrupting delivery of the RF signal to the antenna. Interconnecting with this equipment is a sensor 302 or sensor package 220 and an antenna 202 supported by a mast 201. Line 450 is for transporting signals from the sensor 302 to the switch 408.

Line 440 is for transporting the RF signal to the antenna 202. The electrical signal for driving the antenna 202 may be interrupted when the power supplying the RF signal source is interrupted. For example, using the switch 408 controlled by the sensor to interrupt the power required to operate the RF signal source ends signal transmission via line 440 to the antenna.

Figure 5A:
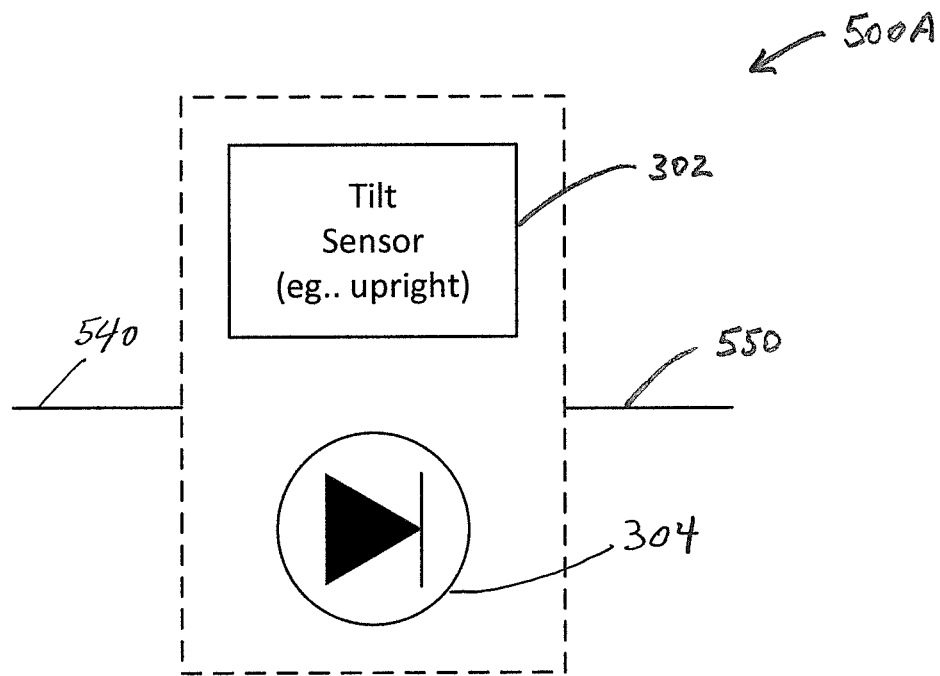
FIGS. 5A-B show a first tilt sensor and optional visual indicator for use with the equipment of FIG. 1.
Figure 5B:
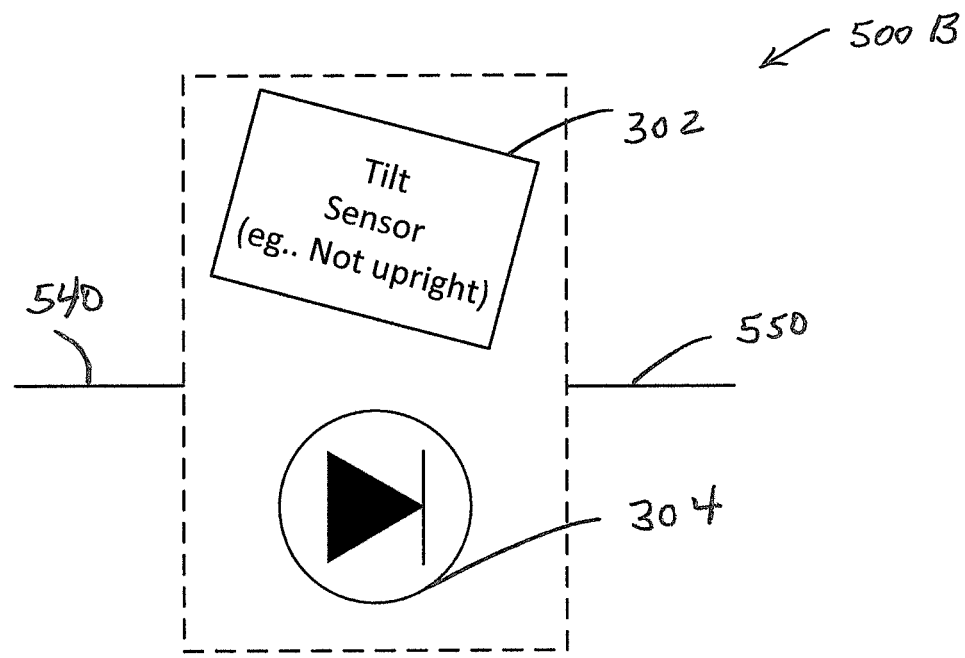

FIGS. 5A-B show a first tilt sensor and optional visual indicator 500A-B. FIG. 5A shows the tilt sensor 302 oriented in an upright position while FIG. 5B shows a tilt sensor that is not oriented in an upright position.

The tilt sensor 302 may be in a powered circuit such as a two wire circuit 540, 550 interconnecting directly or indirectly with switch 408. The tilt sensor may utilize dry contacts in a two wire circuit 540, 550 interconnecting directly or indirectly with switch 408.

In some embodiments, a tilt signal indicating a proper antenna 202 orientation or position results in switch 408 powering the RF signal source 404. In some embodiments, a tilt signal indicating improper orientation or position results in switch 408 not powering RF signal source 404.

An optional visual indicator such as LED 304 may be used to indicate the presence/availability of electrical power. Where the tilt sensor is in a powered circuit, the indicator may be connected with the two wire circuit 540, 550 or in series with one the conductors 540, 550. Where the tilt sensor is not in a powered circuit, yet another pair of wires 540, 550 may be used to power the LED.

Figure 6A:
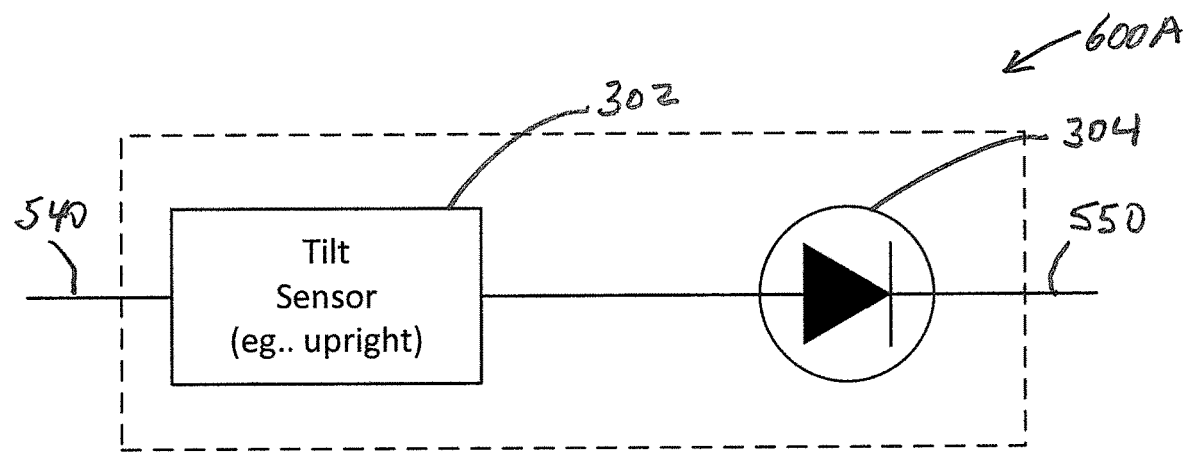
FIGS. 6A-B show a second tilt sensor and optional visual indicator for use with the equipment of FIG. 1.
Figure 6B:
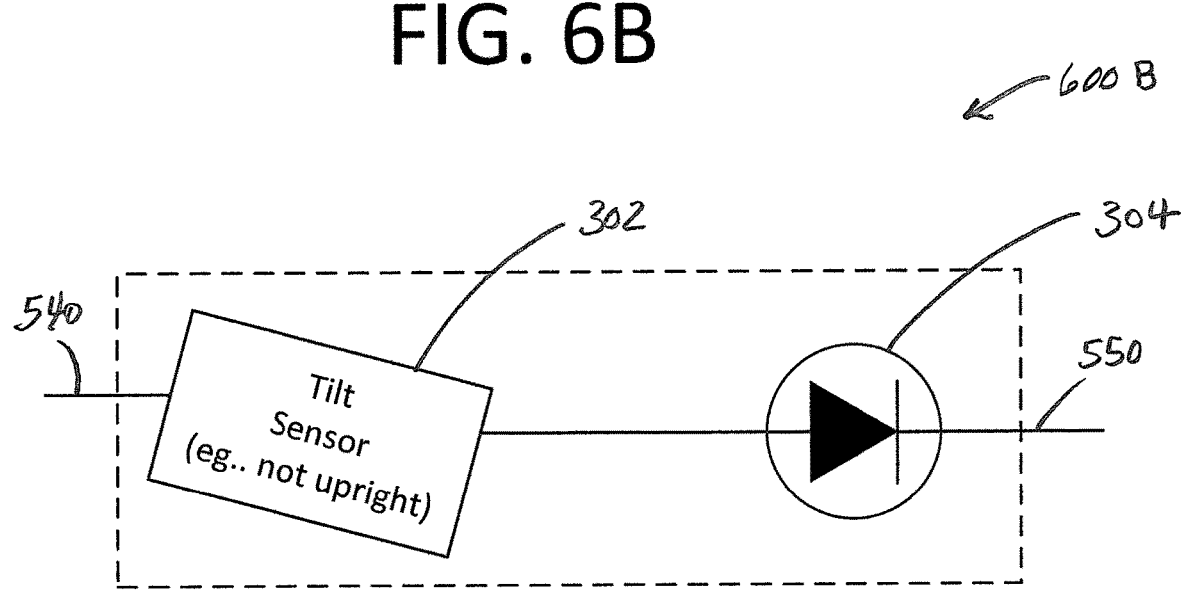

FIGS. 6A-B show a second tilt sensor and series connected optional visual indicator 600A-B. FIG. 6A shows the tilt sensor 302 oriented in an upright position while FIG. 6B shows a tilt sensor that is not oriented in an upright position.

Here, the tilt sensor and LED are in a series circuit 540, 550 that interconnects directly or indirectly with the switch 408. Notably, the circuit 540, 550 may connect in series or otherwise with the switch.

In some embodiments, a tilt signal indicating a proper antenna 202 orientation or position results in switch 408 powering the RF signal source 404. In some embodiments, a tilt signal indicating improper orientation or position results in switch 408 not powering RF signal source 404.

Figure 7A:
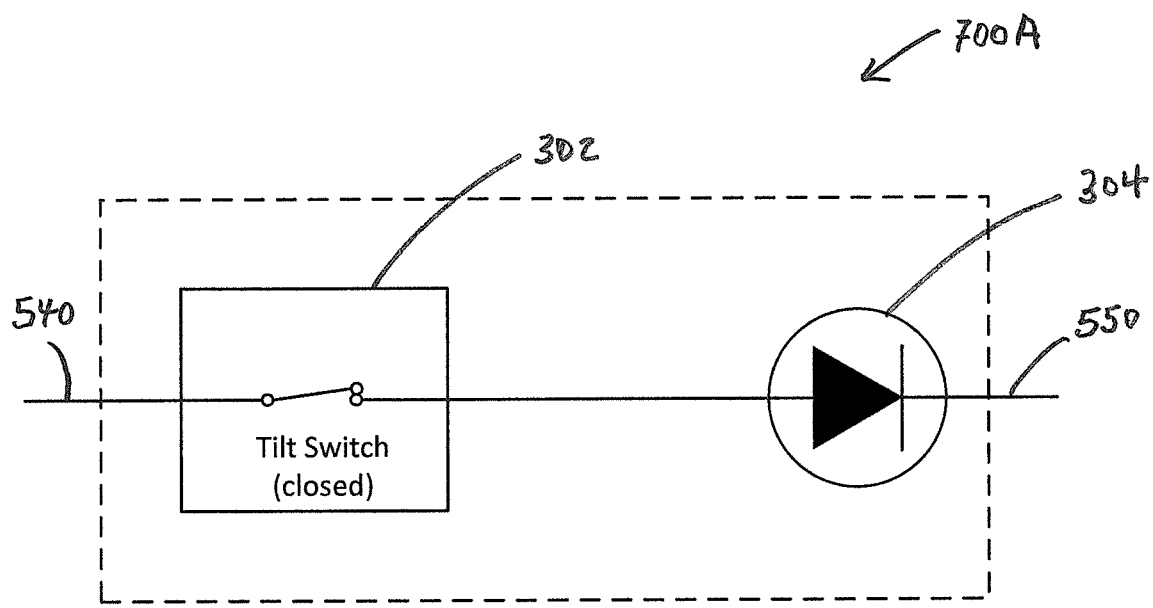
FIGS. 7A-B show a tilt switch and optional visual indicator for use with the equipment of FIG. 1.
Figure 7B:
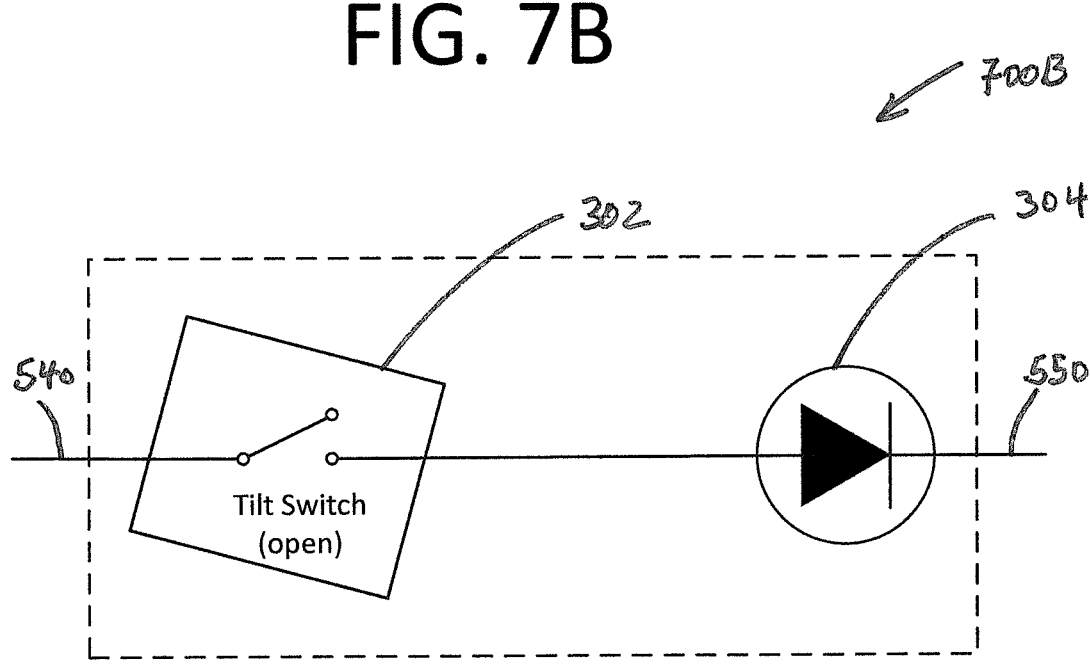

FIGS. 7A-B shows a tilt switch (off/on) and series connected optional visual indicator 700A-B. In this embodiment, FIG. 7A shows the tilt switch 302 in the closed position indicating the antenna is oriented and/or positioned properly such that the antenna 202 receives a signal from the RF signal source 404. Here, the circuit 540, 550 is completed and the LED 340 is illuminated. Alternatively, the switch might be open to indicate the antenna is oriented and or positioned properly such that the antenna 202 receives a signal from the RF signal source 404.

FIG. 7B shows a tilt switch 302 in the open position indicating the antenna is oriented and/or positioned improperly such that the antenna 202 does not receive a signal from the RF signal source 404. Alternatively, the switch might be closed to indicate the antenna is oriented and or positioned properly such that the antenna 202 receives a signal from the RF signal source 404.

Each of FIGS. 8A-C show a front view and side view of the sensor package in various orientations or positions 800A-C.

FIG. 8A shows the sensor package 220 as it might be oriented or positioned when the mast 201 (see FIG. 2A) is upright at 0 degrees with the vertical. In this configuration, the sensor 302 is oriented for proper operation of the antenna.

FIG. 8B shows the sensor package 220 as it might be oriented or positioned when the mast 201 leans to one side, for example at an angle of up to 30 degrees. In this configuration, the sensor 302 is oriented for proper operation of the antenna. Notably, this range of 0+ degrees to 30 degrees may be varied to suit mast height and/or allowable distances from the antenna to a person below. For example, the range may be from 0 degrees to 10 degrees, from 0 degrees to 20 degrees, from 0 degrees to 40 degrees, or from 0 degrees to 45 degrees.

FIG. 8C shows the sensor package 220 as it might be oriented or positioned when the mast 201 leans to one side, for example at an angle greater than 30 degrees. In this configuration, the sensor 302 is not oriented for proper operation of the antenna. Notably, this range of greater than 30 degrees may be varied to suit mast height and/or allowable distances from the antenna to a person below. For example, the range may be angles of lean greater than 5 degrees, greater than 10 degrees, greater than 20 degrees, greater than 40 degrees, and greater than 45 degrees.

As explained above, the RF safety system may prevent potentially dangerous reductions in the distance separating the antenna 202 and persons below when the mast 201 is oriented or positioned improperly.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An RF safety system comprising:
    a single cell phone communications antenna supported by a fixed structure that elevates the antenna above the ground;
    a state of the antenna determined by one or more of orientation, position, and acceleration of the antenna; and,
    implementation of an RF safety system wherein control of radiation from the antenna depends on the state of the antenna.

2. The RF safety system of claim 1 further comprising a sensor that indicates the antenna orientation, position, and/or acceleration.

3. The RF safety system of claim 2 wherein sensor data is used to find a safe distance between the antenna and bystanders.

4. The RF safety system of claim 2 further comprising an assembly that includes the antenna and a vertical construct for holding the antenna aloft.

5. The RF safety system of claim 4 wherein the sensor is mounted on the assembly.

6. The RF safety system of claim 5 further comprising:
    a power supply for supplying an RF signal source;
    the RF signal source for driving the antenna to radiate; and,
    an electrical circuit between the power supply and the antenna for controlling antenna radiation.

7. The RF safety system of claim 6 wherein the electrical circuit is between the RF signal source and the antenna.

8. The RF safety system of claim 7 wherein the electrical circuit acts as a switch.

9. The RF safety system of claim 1 wherein RF signals for driving the antenna to radiate are controlled at least in part based on inclination of the structure.

10. The RF safety system of claim 1 wherein either of a sudden impact to the structure or collapse of the structure results in cessation of RF signals that reach the antenna and no radiation from the antenna.

11. An RF safety system comprising:
    a structure including a cellular telephone antenna tower and a cellular telephone antenna thereon;
    apart from the structure, an electronics cabinet including an RF source;
    the RF source interconnected with the antenna;
    a sensor that indicates impacts to the structure; and,
    an RF safety system that stops RF energy from reaching the antenna when the sensor indicates an impact to the structure has occurred.

12. The RF safety system of claim 11 wherein the tower includes articulated sections.

13. The RF safety system of claim 12 wherein a first of the articulated sections is fastened to a base and a second of the articulated sections, movable with respect to the first articulated section, carries the sensor.

14. The RF safety system of claim 12 wherein the sensor is a tilt sensor.

15. The RF safety system of claim 12 wherein the sensor is capable of indicating a tilt between 0 to 30 degrees.

16. The RF safety system of claim 12 wherein the sensor is capable of indicating a tilt greater than 30 degrees.

17. An RF safety system comprising:
    a structure including a cellular telephone antenna tower and a cellular telephone antenna mounted at the top of the tower;
    apart from the structure an RF source and RF safety system electronics;
    conductors interconnecting the RF source and the cellular telephone antenna;
    conductors interconnecting the RF safety system electronics and a sensor mounted to the cellular telephone antenna tower; and,
    interoperation of the RF safety system electronics and the sensor operable to stop RF energy from reaching the antenna when the sensor indicates an impact to the cellular telephone antenna tower has occurred.

18. The RF safety system of claim 17 wherein RF energy is stopped from reaching the antenna when the sensor indicates a tower tilt of more than 30 degrees.

19. The RF safety system of claim 17 wherein RF energy is not stopped from reaching the antenna when the sensor indicates a tower tilt of 30 degrees or less.

20. The RF safety system of claim 17 wherein the tilt sensor is a switch.

* * * * *